United States Patent [19]

Paisner

[11] Patent Number: 4,822,839

[45] Date of Patent: Apr. 18, 1989

[54] POLYUNSATURATED HYDROCARBON POLYMER-COMPATIBLE ANTIOXIDANT COMPOSITIONS

[75] Inventor: Martin J. Paisner, Wilmington, Del.

[73] Assignee: Hercules Incorporated, Wilmington, Del.

[21] Appl. No.: 125,104

[22] Filed: Nov. 25, 1987

[51] Int. Cl.$^4$ .............................. C08K 5/36; C08K 5/18
[52] U.S. Cl. .................................. 524/239; 524/240; 524/246; 524/248; 524/255; 524/256; 524/291; 524/343; 524/349; 524/351; 524/333; 524/350; 526/283
[58] Field of Search ............... 524/255, 256, 248, 246, 524/239, 240, 291, 343, 349, 351, 333, 350; 526/283; 252/401, 403; 585/2, 5

[56] References Cited

U.S. PATENT DOCUMENTS

| | | | |
|---|---|---|---|
| 3,637,865 | 1/1972 | Haring | 524/349 |
| 3,991,139 | 11/1976 | Kokuryo et al. | 524/343 |
| 4,007,230 | 2/1977 | Hinze | 521/117 |
| 4,020,254 | 4/1977 | Ofstead | 526/283 |
| 4,136,248 | 1/1979 | Tenney | 526/283 |
| 4,324,717 | 4/1982 | Layer | 524/248 |
| 4,400,340 | 8/1983 | Klosiewicz | 264/328.6 |
| 4,689,380 | 8/1987 | Nahm | 526/283 |

FOREIGN PATENT DOCUMENTS 0048439 3/1982 European Pat. Off. .
59-98148 6/1984 Japan .

OTHER PUBLICATIONS

Pure & Applied Chemistry vol. 55, No. 10, pp. 1637–1650 (1983) "Synergism of Antioxidants".

Primary Examiner—Veronica P. Hoke
Attorney, Agent, or Firm—W. S. Alexander; M. D. Kuller

[57] ABSTRACT

A polyunsaturated hydrocarbon polymer-compatible anti-oxidant composition is provided which comprises a mixture of at least one sterically hindered phenolic compound and at least one aryl amine compound in a molar ratio ranging from about 0.1 to about 10.

8 Claims, No Drawings

POLYUNSATURATED HYDROCARBON POLYMER-COMPATIBLE ANTIOXIDANT COMPOSITIONS

BACKGROUND OF THE INVENTION

Polycycloolefin monomers, such as dicyclopentadiene norbornene, norbornadiene and other norbornene-type monomers, are known to undergo ring-opening polymerization reactions in the presence of a metathesis catalyst to form, high modulus, high impact strength polyunsaturated hydrocarbon polymers. For example, U.S. Pat. No. 4,400,340 describes the production of a poly(dicyclopentadiene) (PDCP) polymer from the metathesis catalyst ring-opening polymerization of dicyclopentadiene. Similarly, U.S. Pat. No. 4,568,660 describes the metathesis catalyst ring-opening copolymerization of dicyclopentadiene with such norbornene-type polycycloolefins as 1,4,5,8-dimethano-1,4,4a,5,8-8a-hexahydronaphthalene (DMHN), and 1,4,5,8-dimethano-1,4,4a,5,8,8a-octahydronaphthalene (DMON).

Such polymers, however, can be subject to degradation of their physical properties such as tensile elongation, structural integrity, modulus and impact strength due to olefin oxidation on exposure to light, heat and/or air over periods of time. Various antioxidant stabilizers have been proposed to delay such oxidation. For example, hindered phenolic and aryl amine compounds have been found useful as antioxidant stabilizing compounds for these polymers. Hindered phenolic compounds by themselves, however, have been found to be of limited effectiveness in delaying degradation of such physical properties as tensile elongation and impact strength of the polymers when incorporated therein as an antioxidant stabilizing compound, such properties exhibiting degradation after relatively short aging times. Aryl amine compounds have been found to afford some increase in protection against the loss of physical properties by oxidation of olefinic material, relative to phenolic compounds, but such degradation still proceeds within relatively short time periods. Moreover, unlike hindered phenolic compounds, some aryl amines, for example, N,N'-diphenyl-phenylenediamine, when used alone, have been found to be incompatible with polymers such as PDCP, and when incorporated therein as a stabilizing antioxidant, tend to "bleed" or otherwise migrate to the surface of such polymeric material. Such bleeding can then cause polymer discoloration and also staining of painted surfaces by further migration through the paint film.

It is an object of this invention, therefore, to provide an antioxidant stabilizing system for polymers formed from ring-opening metathesis catalyst polymerization of norbornene-type monomers such as dicyclopentadiene, tricyclopentadiene (and other oligomers of dicyclopentadiene), norbornene, norbornadiene, DMHN and DMON, and copolymers and terpolymers formed from ring-opening copolymerization of mixtures of such monomers which effectively delays degradation by olefin oxidation of such of the polymer's physical properties as mentioned above.

It is a further object of this invention to provide such an antioxidant stabilizing system which is compatible with the aforementioned polymers and which does not cause discoloration of either the polymer when incorporated therein, or of any of several paint systems which have been applied on the polymer for aesthetic purposes.

SUMMARY OF THE INVENTION

A synergistic antioxidant composition is provided which when incorporated into a ring-opening metathesis catalyst polymerized polyunsaturated hydrocarbon polymer, significantly and unexpectedly delays the onset of loss of the polymer's physical properties due to oxidation compared to the relatively poor oxidation protection offered by currently available antioxidants when used alone. Further, such antioxidant composition is compatible with the polyunsaturated polymers it is used in conjunction with and does not cause polymer discoloration or discoloration of any paint systems supplied thereto. The composition of the polymer-compatible antioxidant system of the present invention which gives the aforementioned surprising and unexpected results comprises a mixture of at least one sterically hindered phenolic compound and at least one aryl amine compound in a molar ratio ranging from about 0.1 to about 10.

This invention is further illustrated by the following detailed description.

DETAILED DESCRIPTION OF THE INVENTION

In accordance with the present invention, a polyunsaturated hydrocarbon polymer-compatible antioxidant composition is provided comprising:

(a) at least one sterically hindered phenolic compound having the following general formulas:

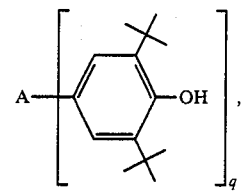

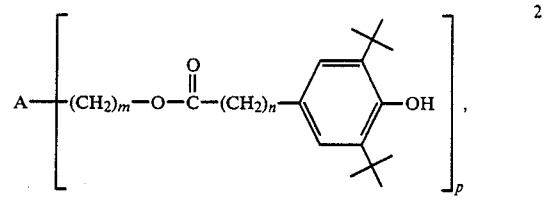

where A represents a mono or polyvalent organic radical selected from S, a straight-chain or branched $C_1$ to $C_{20}$-alkyl group, a straight-chain or branched $C_2$ to $C_{20}$-alkenyl group, an aryl group, a $C_7$ to $C_{20}$-aralkyl group, or a $C_7$ to $C_{20}$-aralkenyl group; and m represents an integer from 0–20, and n represents a positive integer from 1–20, and p and q each represent a positive integer from 1–4; and (b) at least one aryl amine compound having the following general formulas:

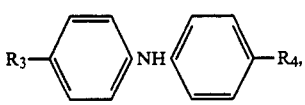

where $R_1$–$R_4$ are the same or different hydrogen atoms, a straight-chain or branched $C_1$ to $C_{20}$-alkyl group, a straight-chain or branched $C_2$ to $C_{20}$-alkenyl group, an aryl group, a $C_7$ to $C_{20}$-aralkyl group or a $C_7$ to $C_{20}$-aralkenyl group, or a radical having the following general formulas:

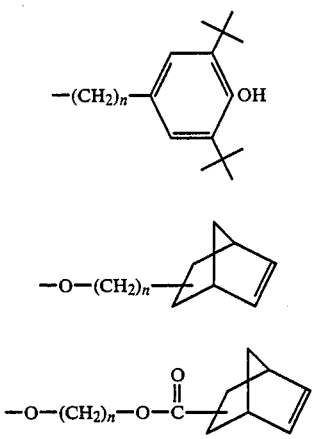

in which n represents a positive integer from 1–20, wherein the sterically hindered phenolic compound and aryl amine compound are present in a molar ratio ranging from about 0.1 to about 10.

Examples of sterically hindered phenolic compounds suitable for use in the present invention include 2,6-ditertiarybutyl-4-methylphenol,2,6-ditertiarybutyl-4-ethyl phenol 2,6-ditertiarybutyl-4-n-butyl phenol, 4-hydroxymethyl-2,6-ditertiarybutyl phenol, and such commercially available compounds as thiodiethylene bis(3,5-ditertiarybutyl-4-hydroxyl)hydrocinnamate, octadecyl 3,5-ditertiarybutyl-4-hydroxyhydrocinnamate, 1,6-hexamethylene bis(3,5-ditertiarybutyl-4-hydroxyhydrocinnamate), and tetrakis(methylene(3,5-ditertiarybutyl-4-hydroxyhydrocinnamate))methane, all available as Irganox 1035, 1076, 259 and 1010, respectively, from CibaGeigy Corporation. Other examples of sterically hindered phenolics useful herein include 1,3,5-trimethyl-2,4,6-tris(3,5-ditertiarybutyl-4-hydroxybenzyl)benzene and 4,4'-methylene-bis(2,6-ditertiarybutylphenol), available as Ethyl 330 and 702, respectively, from Ethyl Corporaiton.

Suitable aryl amine compounds which can be employed herein, for example, include various commercially available compounds such as diphenylamine (DPA), N,N'-diphenyl-paraphenylenediamine, N,N'-dibeta-napthyl-para-phenylene diamine, dioctylated diphenylamine and octylated diphenylamine, all available as Agerite DPPD, White, Stalite S and Stalite, respectively, from R. T. Vanderbilt Company, Inc.; p-orientated styrenated diphenylamine and dimethyl diaryl-paraphenylenediamine, both available as Wingstay 29 and 200, respectively, from Goodyear Tire & Rubber Co.; N,N'-bis(1,4-dimethylpentyl-parapenylenediamine, available as Flexone 4L from Uniroyal, Inc.; and N-phenyl-N'-(1,3-dimethylbutyl)-para-phenylenediamine, available as Antozite 67 from R. T. Vanderbilt Co., Inc.

In a preferred embodiment of this invention, the aforementioned sterically hindered phenolic-aryl amine antioxidant composition can be incorporated into a non-polymerized norbornene-type monomer, for example, dicyclopentadiene, tricyclopentadiene (and other oligomers of dicyclopentadiene), norbornene, norbornadiene, DMHN and DMON, or mixtures of such monomers. It is preferred, however, that the mixture comprise dicylcopentadiene or a mixture of dicyclopentadiene with one or more such norbornene-type monomers. The ring-opening metathesis catalyst polymerization of the resulting monomer mixture, for purposes of this invention, can then be conducted by a variety of procedures and catalyst systems known in the art to produce a polymer (copolymer or terpolymer) containing the sterically hindered phenolic-aryl amine antioxidant composition responsible for the polymer's unexpected resistance to oxidation.

A preferred method for carrying out metathesis catalyst polymerization of dicyclopentadiene monomer in the presence of the sterically hindered phenolic-aryl amine antioxidant compositon is taught, for example, in U.S. Pat. No. 4,400,340. In such a process, known as reaction injection molding (RIM), at least two streams comprising a two-part metathesis catalyst system are mixed together, the combined streams then being injected into a mold where they quickly set up into a solid polymerized mass. Of the two-part metathesis catalyst system, one part (A), contains a mixture of polymerizable monomer and at least one soluble tungsten containing catalyst, such as tungsten halide of tungsten oxyhalide, preferably $WCL_6$ or $WOCL_4$. The other part (B), which also contains polymerizable monomer, contains at least one organoaluminum catalyst activator selected from the group of compounds consisting of trialkylaluminum compounds, dialkylaluminum halides, alkylaluminum dihalides and alkylaluminum sesquihalides wherein the alkyl group contains from 1 to 12 carbon atoms. In a preferred catalyst activator, the alkyl group is ethyl with diethyl aluminum chloride being the most preferred. The sterically hindered phenolic-aryl amine antioxidant composition can be incorporated into the polymerizable monomer mixture of either part of the above described catalyst system, however, it is preferred to incorporate the mixture into part (A). In an alternative embodiment, a three stream RIM may be employed wherein the sterically hindered phenolic-aryl amine antioxidant composition is incorporated into a third stream containing only polymerizable monomer, part (C), and which is separate from the streams of parts (A) and (B) above containing catalyst and catalyst activator, respectively.

The relative proportion of sterically hindered phenolicaryl amine antioxidant composition in accordance with this invention, can vary about 0.25 to about 4 parts by weight, preferably from about 0.25 to about 2 parts per 100 parts by weight of polymerizable monomer.

In accordance with this invention, the tungsten compounds are employed at a level of from about 0.3 to about 1.5 millimoles, preferably from about 0.4 to about 0.6 millimoles per mole of polymerizable monomer mixture of part (A) of the above-mentioned catalyst system.

The organoaluminum catalyst activator compounds are useful in this invention at levels ranging from about 1.0 to about 3.5 millimoles, preferably from about 1.2 to about 1.8 millimoles per mole of polymerizable monomer mixture of part (B) of the aforementioned catalyst system.

The tungsten catalyst compounds are typically dissolved in a solvent prior to incorporation into the monomer mixture of part (A) of the catalyst system. Preferably, the tungsten compound can first be suspended in a suitable non-reactive solvent, for example, an aromatic solvent such as benzene, toluene, xylene, chlorobenzene, dichlorobenzene or trichlorobenzene, then solubilized by the addition of an alcoholic or phenolic compound, preferably, phenol, alkyl phenols, or halogenated phenols, with tert-butyl phenol, tert-octyl phenyl and nonyl phenol being the most preferred. The preferred molar ratio of tungsten compound-phenolic compound can range from about 1:1 to about 1:3.

The organoaluminum activator compounds are also preferably dissolved in a solvent such as those described above prior to use in this invention.

Usually, as described in U.S. Pat. No. 4,400,340 a stabilization agent is added to the monomer mixture of part (A) of the catalyst system to prvent premature monomer polymerization and to prolong storage life of this component. Such compounds useful in this invention in amounts ranging from about 1 to about 5 moles per mole of tungsten compound preferably include chelating, and/or complexing agents, for example, acetylacetones, alkylacetoacetates wherein the alkyl group contains from 1 to 10 carbon atoms, and Lewis bases, for example, benzonitrile and tetrahydrofuran. The improvement in stability and storage life of the tungsten compound/monomer mixture is obtained whether the complexing agent is added before or after the phenolic compound.

Further, metathesis catalyst polymerization of polymerizable monomer in the presence of the sterically hindered phenolic-aryl amine antioxidant composition, wherein parts (A) and (B) or alternatively, parts (A), (B) and (C), of the catalyst system are mixed together, must be delayed such that the polymerizable mixture does not set up in a mixing head but does set up in a mold. This can be accomplished by the addition of a reaction rate moderator to part (B) of the catalyst system. Examples of compounds useful as reaction rate moderators for the alkylaluminum compounds contained in part (B) in accordance with this invention include ethers, esters, ketones, nitriles and polar cycloolefins, with ethyl benzonate, isopropyl ether, butyl ether and bis($\alpha$-methoxyethyl) ether, diisopropyl ketone and phenylethyl acetate being preferred. The preferred ratio of the alkylaluminum compound to reaction rate moderator can range from about 0.2 to about 3.5 on a molar basis.

The metathesis polymerization reaction is temperature dependent with the reaction rate increasing with increasing temperature. Generally, the reaction mixture of parts (A) and (B) (and (C)) of the catalyst system can be cooled or heated to polymerization temperature at the start of the mixing or at any point during the addition of the various reactants and components of the catalyst system.

The RIM process wherein metathesis catalyst polymerization is carried out in accordance with this invention is well known, the details of which will be readily apparent to those skilled in the art.

The following examples more fully illustrate a preferred embodiment of the instant invention. It is not intended, however, that the present invention be limited in any way thereto.

EXAMPLES I-XXIV

The following examples illustrate metathesis catalyst polymerized poly(dicyclopentadiene) matrixes having incorporated therein preferred sterically hindered phenolic-aryl amine antioxidant compositions of the present invention which provide for unexpectedly increased polymer oxidative stability relative to the poor oxidation protection demonstrated by currently available antioxidants when used alone.

In Examples I-V, a three-stream RIM process comprising parts (A), (B) and (C) is employed to prepare samples of poly(dicyclopentadiene) having incorporated therein the indicated antioxidant systems which are then tested for antioxidant activity, as summarized in Table I below.

TABLE I

| Example | Type Aryl amine/Phenol | Mole % Aryl amine | Mole % Phenol | PDSC (°C.) | PDSC Induction Time (min. @ 550 psi) |
|---|---|---|---|---|---|
| I | DPA/Irganox 1035 | 0.78 | 0.10 | 130 | 70 |
|  | DPA | 0.88 |  |  | 30 |
|  | Irganox 1035 |  | 0.88 |  | 47 |
| II | DPA/Irganox 1035 | 0.78 | 0.21 | 150 | 37 |
|  | DPA | 0.98 |  |  | 10 |
|  | Irganox 1035 |  | 0.98 |  | 20 |
| III | DPA/Irganox 259 | 0.78 | 0.21 | 130 | 93 |
|  | DPA | 0.99 |  |  | 45 |
|  | Irganox 259 |  | 0.99 |  | 52 |
| IV | DPA/Ethyl 702 | 0.78 | 0.20 | 130 | 66 |
|  | DPA | 0.98 |  |  | 45 |
|  | Ethyl 702 |  | 0.98 |  | 22 |
| V | DPPD/Irganox 1035 | 0.51 | 0.21 | 130 | 72 |
|  | DPPD | 0.72 |  |  | 57 |
|  | Irganox 1035 |  | 0.72 |  | 28 |
| VI | Antozite 67/Irganox 1035 | 0.51 | 0.10 | 150 | 16.5 |
|  | Antozite 67 | 0.61 |  |  | 6.2 |
|  | Irganox 1035 |  | 0.61 |  | 11.3 |
| VII | Stalite S/Irganox 1035 | 1.0 | 1.1 | 150 | 12 |
|  | Stalite S | 1.1 |  |  | 8.5 |
|  | Irganox 1035 |  | 1.1 |  | 6 |
| VIII | Stalite/Irganox 1035 | 1.0 | 0.1 | 150 | 12 |
|  | Stalite | 1.1 |  |  | 3 |
|  | Irganox 1035 |  | 1.1 |  | 6 |

Preparation of part (A): A 0.5 molar solution of tungsten catalyst is prepared by adding 100 grams of $WCL_6$ to 60 milliliters of dry toluene under a nitrogen atmosphere, followed by the addition of a solution of 41 grams of paratertiarybutylphenol(t-BuOH) in 30 milliliters of toluene. The catalyst solution is sparged overnight with nitrogen to remove traces of HCL. Next, 0.44 milliliters of the tungsten catalyst solution prepared above is syringed into a sparged artight bottle containing 20 milliliters of dicyclopentadiene which has been purified according to the procedure as set forth in U.S. Pat. No. 4,400,340.

Preparation of part (B): A 1.0 molar activator monomer solution is prepared by combining, under a blanket nitrogen atmosphere, dicyclopentadiene and a mixture of tri-N-octyl aluminum (TNOA) and dioctylaluminum iodide (DOAI) in a 85/15 molar ratio. A reaction moderator, diglime (DY) is then added to achieve a 85/15/100 molar ratio of TNOA/DOAI/DY. Next, 0.34 milliliters of activator monomer solution prepared above is syringed into a sparged airtight bottle containing 20 milliliters of purified dicyclopentadiene.

Preparation of part (C): A third stream is prepared which contains the indicated sterically hindered phenolic-aryl amine antioxidant compositions or comparative antioxidants and dicyclopentadiene. A mixture of the indicated sterically hindered phenolic and aryl amine compounds is prepared in the desired molar ratio, then added to a sparged airtight bottle containing 20 milliliters of dicyclopentadiene. Solutions of comparative antioxidants used alone and polymerizable monomer are prepared in similar fashion.

Polymerization of dicyclopentadiene monomer is then accomplished by simultaneously injecting two milliliters of each component, (A), (B), and (C), into a common mixing vessel which flows into a reaction vessel.

After metathesis catalyst polymerization of the monomer mixtures of components (A), (B), and (C), above, the effect on oxidative stability of the resulting poly(dicyclopentadiene) matrix by the various sterically hindered phenolic-aryl amine antioxidant compositions and comparative antioxidants incorporated therein is determined using high pressure differential scanning calorimetry (PDSC). Such a technique is described, for example, in 91 Themochimica Acta 87-94 (1985) and in Proceedings of the 13th North American Thermal Analysis Society, Philadelphia, PA. p. 520 (1984). Using this technique, the time taken for a given sample to begin the process of autooxidation at a constant temperature, as exhibited by a sudden exothermic reaction, is measured. The results, as summarized above in Table I, illustrate the unexpected increased oxidative stability (PDSC induction time as a measure of minutes) of the poly(dicyclopentadiene) matrix achieved for a given molar ratio of antioxidant compositions of the present invention.

I claim:

1. A ring-opening metathesis catalyst polymerizable composition comprising dicyclopentadiene and a polyunsaturated hydrocarbon polymer-compatible mixture comprising:
   (a) at least one sterically hindered phenolic compound having one of the following general formulas:

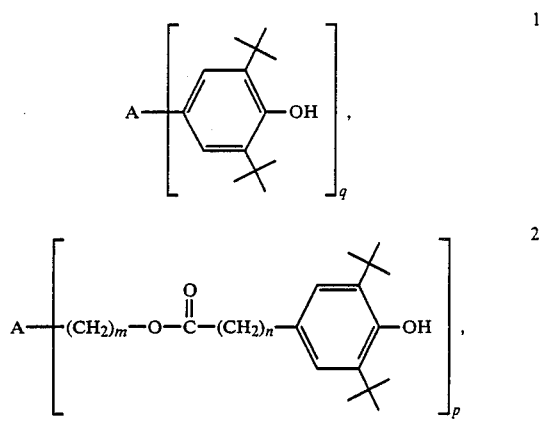

where A represents S or a mono or polyvalent organic radical selected from a straight-chain or branched $C_1$ to $C_{20}$-saturated aliphatic group, a straight-chain or branched $C_2$ to $C_{20}$-unsaturated aliphatic group, an aryl group, a $C_7$ to $C_{20}$-aralkyl group, or a $C_7$ to $C_{20}$-aralkenyl group; and m represents a positive integer from 0–20, and n represents a positive integer from 1–20, and p and q each represent a positive integer from 1–4; and (b) at least one aryl amine compound having one of the following general formulas:

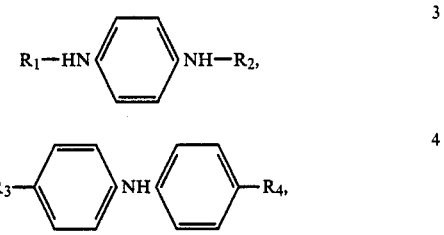

where $R_1$–$R_4$ can be the same or different and can be hydrogen atoms, or straight-chain or branched $C_1$ to $C_{20}$-alkyl groups, straight-chain or branched $C_2$ to $C_{20}$-alkylene groups, aryl groups, $C_7$ to $C_{20}$-aralkyl groups or a $C_7$ to $C_{20}$-aralkenyl groups, or radicals having one of the following formulas:

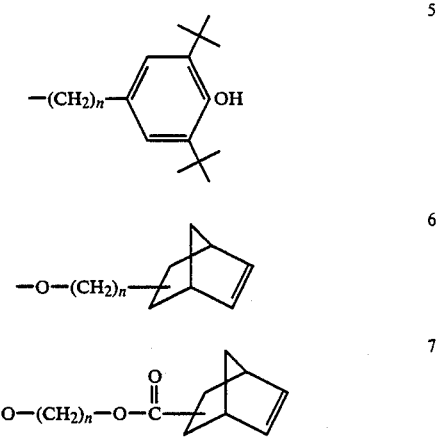

in which n represents a positive integer from 1–20, wherein the sterically hindered phenolic compound and aryl amine compound are present in a molar ratio ranging from about 0.1 to about 10 and the polyunsaturated hydrocarbon polymer-compatible mixture is present in an amount ranging from about 0.25 to about 4 parts per 100 parts by weight dicyclopentadiene.

2. A ring-opening metathesis catalyst polymerizable composition as claimed in claim 1, further comprising at least one copolymerizable norbornene-type monomer selected from the group consisting of tricyclopentadiene, norbornene, norbornadiene, 1,4,5,8-dimethano-1,4,4a,5,8,8a-hexahydronaphthalene and 1,4,5,8-dimethano-1,4,4a,5,8,8a-octahydronaphthalene.

3. A ring-opening metathesis catalyst polymerizable composition comprising dicyclopentadiene and a polyunsaturated hydrocarbon polymer-compatible mixture comprising:
(a) a sterically hindered phenolic compound selected from the group consisting of 2,6-ditertiary-butyl-4-methylphenol, 2,6-ditertiarybutyl-4-ethyl phenol, 2,6-ditertiarybutyl-4-n-butyl phenol, 4-hydroxymethyl-2,6-ditertiarybutyl phenol, thiodiethylene bis(3,5-ditertiarybutyl-4-hydroxyl)-hydrocinnamate, octadecyl 3,5-ditertiarybutyl-4-hydroxyhydro-cinnamate, 1,6-hexamethylene bis(3,5-ditertiarybutyl-4-hydroxyhydrocinnamate), tetrakis(methylene(3,5-ditertiary-butyl-4-hydroxyhydrocinnamate))methane, 1,3,5-trimethyl-2,4,6-tris(3,5-ditertiarybutyl-4-hydroxybenzyl)benzene, and 4,4'-methylene-bis(2,6-ditertiarybutylphenol); and (b) an aryl amine compound selected from the group consisting of diphenylamine, N,N'-diphenyl-para-phenylenediamine, N,N'-dibeta-napthyl-para-phenylenediamine, dioctylated diphenylamine, octylated diphenylamine, p-orientated styrenated diphenylamine, dimethyl diaryl-para-phenylenediamine, N,N'-bis(1,4-dimethylpentyl)-para-phenylenediamine, and N-phenyl-N'-(1,3-dimethylbutyl)-para-phenylenediamine; wherein the sterically hindered phenolic compound and aryl amine compound are present in a molar ratio ranging from about 0.1 to about 10 and the polyunsaturated hydrocarbon polymer-compatible mixture is present in an amount ranging from about 0.25 to about 4 parts per 100 parts by weight dicyclopentadiene.

4. The composition of claim 3 wherein the sterically hindered phenolic compound which is thiodiethylene bis(3,5-ditertiarybutyl-4-hydroxyl)-hydrocinnamate, and the aryl amine compound is diphenylamine.

5. A dicyclopentadiene polymer resulting from the metathesis catalyst polymerization of the composition as claimed in claim 1.

6. A dicyclopentadiene polymer resulting from the metathesis catalyst polymerization of the composition as claimed in claim 2.

7. A dicyclopentadiene polymer resulting from the metathesis catalyst polymerization of the composition as claimed in claim 3.

8. A dicyclopentadiene polymer resulting from the metathesis catalyst polymerization of the composition as claimed in claim 4.

* * * * *